US010167613B2

(12) United States Patent
Kondo et al.

(10) Patent No.: US 10,167,613 B2
(45) Date of Patent: Jan. 1, 2019

(54) HYDRAULIC DRIVE SYSTEM OF CONSTRUCTION MACHINE

(71) Applicant: KAWASAKI JUKOGYO KABUSHIKI KAISHA, Kobe-shi, Hyogo (JP)

(72) Inventors: Akihiro Kondo, Nishinomiya (JP); Yoji Yudate, Kobe (JP); Takehisa Kato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 47 days.

(21) Appl. No.: 15/535,217

(22) PCT Filed: Dec. 7, 2015

(86) PCT No.: PCT/JP2015/006069
§ 371 (c)(1),
(2) Date: Jun. 12, 2017

(87) PCT Pub. No.: WO2016/092808
PCT Pub. Date: Jun. 16, 2016

(65) Prior Publication Data

US 2017/0342685 A1 Nov. 30, 2017

(30) Foreign Application Priority Data

Dec. 10, 2014 (JP) ................................ 2014-249816

(51) Int. Cl.
*F16D 31/02* (2006.01)
*E02F 9/22* (2006.01)
(Continued)

(52) U.S. Cl.
CPC ............ *E02F 9/2228* (2013.01); *E02F 9/123* (2013.01); *E02F 9/2075* (2013.01);
(Continued)

(58) Field of Classification Search
CPC ....... F15B 21/14; E02F 9/2075; E02F 9/2091; E02F 9/2217
(Continued)

(56) References Cited

U.S. PATENT DOCUMENTS 7,827,787 B2 * 11/2010 Cherney ............... E02F 9/2217 60/414
8,362,629 B2 * 1/2013 Weber ................... E02F 9/2217 60/414
(Continued)

FOREIGN PATENT DOCUMENTS

JP H08-60705 A 3/1996

*Primary Examiner* — Michael Leslie
(74) *Attorney, Agent, or Firm* — Oliff PLC

(57) ABSTRACT

A pump that supplies hydraulic oil to a boom cylinder and a turning hydraulic motor; a regenerative hydraulic motor is coupled to the pump and to which the hydraulic oil discharged from the boom cylinder at a time of boom lowering and/or the hydraulic oil discharged from the turning hydraulic motor at a time of turning deceleration is/are led; an engine drives the pump; an alternator mounted to the engine and operable to rotate an output shaft of the engine when electric power is supplied to the alternator; an electrical storage device connected to the alternator; a power converter interposed between the alternator and the electrical storage device; and a controller that switches the power converter to either a servo-on state or a servo-off state and that controls the power converter either in a charging mode or in a discharging mode when switching the power converter to the servo-on state.

7 Claims, 11 Drawing Sheets

(51) Int. Cl.
*F15B 21/14* (2006.01)
*E02F 9/12* (2006.01)
*E02F 9/20* (2006.01)

(52) U.S. Cl.
CPC .......... *E02F 9/2091* (2013.01); *E02F 9/2217* (2013.01); *E02F 9/2285* (2013.01); *E02F 9/2292* (2013.01); *E02F 9/2296* (2013.01); *F15B 21/14* (2013.01); *F15B 2211/3116* (2013.01); *F15B 2211/355* (2013.01); *F15B 2211/50563* (2013.01); *F15B 2211/575* (2013.01); *F15B 2211/6355* (2013.01)

(58) Field of Classification Search
USPC ............................................................ 60/414
See application file for complete search history.

(56) References Cited

U.S. PATENT DOCUMENTS

| | | | | |
|---|---|---|---|---|
| 8,606,448 | B2 * | 12/2013 | Anders ................. | E02F 9/2091<br>180/65.285 |
| 9,200,430 | B2 * | 12/2015 | Kawasaki ............. | E02F 9/2217 |

* cited by examiner

HYDRAULIC DRIVE SYSTEM OF CONSTRUCTION MACHINE

TECHNICAL FIELD

The present invention relates to a hydraulic drive system of a construction machine.

BACKGROUND ART

In construction machines such as hydraulic excavators and hydraulic cranes, the components thereof are driven by a hydraulic drive system. In such a hydraulic drive system, hydraulic oil is supplied to various actuators from a pump driven by an engine.

For example, Patent Literature 1 discloses a hydraulic drive system in which a booster pump driven by an electric motor is used in addition to a main pump driven by an engine. The booster pump is intended for increasing the amount of hydraulic oil supplied to actuators at high load.

Specifically, in the hydraulic drive system disclosed in Patent Literature 1, an alternator is mounted to the engine driving the main pump, and the alternator is connected to a battery. The alternator is a compact low power (e.g., a nominal voltage of 24 V) generator that includes a rotary shaft connected to the output shaft of the engine via a motive power transmitter, such as a belt. The battery is connected via a relay to the electric motor that drives the booster pump. The relay is turned ON at high load.

CITATION LIST

Patent Literature

PTL 1: Japanese Laid-Open Patent Application Publication No. H08-60705

SUMMARY OF INVENTION

Technical Problem

However, in a case where the alternator is directly connected to the battery (which is one type of an electrical storage device) as in the hydraulic drive system disclosed by Patent Literature 1, while the engine is in operation, electric power generated by the alternator is always transmitted to the battery regardless of whether the engine load is high or low.

Meanwhile, in a hydraulic drive system, it is desired that energy be regenerated by utilizing the hydraulic oil that is returned from an actuator to the tank at the time of, for example, boom lowering and/or turning deceleration.

In the hydraulic drive system disclosed by Patent Literature 1, even in a case where energy can be regenerated at the time of boom lowering and/or turning deceleration, electric power is always generated by the alternator, and thus energy is wastefully consumed.

In view of this, an object of the present invention is to provide a hydraulic drive system of a construction machine, the system being capable of regenerating energy while controlling electric power transmission from an alternator to an electrical storage device.

Solution to Problem

In order to solve the above-described problems, a hydraulic drive system of a construction machine according to the present invention includes: a pump that supplies hydraulic oil to a boom cylinder and a turning hydraulic motor; a regenerative hydraulic motor that is coupled to the pump and to which the hydraulic oil discharged from the boom cylinder at a time of boom lowering and/or the hydraulic oil discharged from the turning hydraulic motor at a time of turning deceleration is/are led; an engine that drives the pump; an alternator mounted to the engine and operable to rotate an output shaft of the engine when electric power is supplied to the alternator; an electrical storage device connected to the alternator; a power converter interposed between the alternator and the electrical storage device, the power converter being switched between a servo-on state in which electric power transmission between the alternator and the electrical storage device is enabled and a servo-off state in which electric power transmission between the alternator and the electrical storage device is disabled; and a controller that switches the power converter to either the servo-on state or the servo-off state and that controls, when switching the power converter to the servo-on state, the power converter either in a charging mode of adjusting electric power transmitted from the alternator to the electrical storage device or in a discharging mode of adjusting electric power transmitted from the electrical storage device to the alternator.

According to the above configuration, the regenerative hydraulic motor is coupled to the pump driven by the engine. Therefore, by utilizing the alternator mounted to the engine, in other words, without additionally installing a motor generator at the pump side (load side) as seen from the engine, the energy recovered by the regenerative hydraulic motor can be stored in the electrical storage device as electrical energy. Moreover, since the power converter is interposed between the alternator and the electrical storage device, electric power transmission from the alternator to the electrical storage device can be controlled. For example, when the electrical storage device is fully charged, the power converter is switched to the servo-off state. This makes it possible to assist the driving of the pump by utilizing the energy recovered by the regenerative hydraulic motor instead of storing electric power in the electrical storage device. Moreover, by switching the power converter to the servo-on state and controlling the power converter in the discharging mode, the driving of the pump can be assisted by utilizing the electric power stored in the electrical storage device.

The hydraulic oil discharged from the boom cylinder at the time of boom lowering may be led to the regenerative hydraulic motor. When a boom charging condition, which is a condition that boom lowering be currently performed and the electrical storage device be currently in a chargeable state, is satisfied, the controller may switch the power converter to the servo-on state and control the power converter in the charging mode, and when the boom charging condition is not satisfied, the controller may either switch the power converter to the servo-off state, or switch the power converter to the servo-on state and control the power converter in the discharging mode. According to this configuration, energy at boom lowering can be regenerated.

The hydraulic oil discharged from the boom cylinder at the time of boom lowering and the hydraulic oil discharged from the turning hydraulic motor at the time of turning deceleration may be led to the regenerative hydraulic motor. When either a boom charging condition, which is a condition that boom lowering be currently performed and the electrical storage device be currently in a chargeable state, or a turning charging condition, which is a condition that turning deceleration be currently performed and the electrical storage device be currently in a chargeable state, is satisfied, the controller may switch the power converter to the servo-on state and control the power converter in the charging mode, and when neither the boom charging condition nor the turning charging condition is satisfied, the controller may either switch the power converter to the servo-off state, or switch the power converter to the servo-on state and control the power converter in the discharging mode. According to this configuration, energy at boom lowering and energy at turning deceleration can be regenerated.

The above hydraulic drive system may include a boom control valve that controls supply and discharge of the hydraulic oil to and from the boom cylinder. The boom control valve may be connected to the regenerative hydraulic motor by a boom discharge line, and a tank line may be connected to the boom control valve. The boom control valve may be configured such that at a time of boom raising, the hydraulic oil discharged from the boom cylinder flows into the tank line through the boom control valve, and at the time of boom lowering, the hydraulic oil discharged from the boom cylinder flows into the boom discharge line through the boom control valve. According to this configuration, the hydraulic oil discharged from the boom cylinder can be automatically led to the regenerative hydraulic motor at the time of boom lowering.

The regenerative hydraulic motor may be a variable displacement motor whose tilting angle is changeable. The above hydraulic drive system may include a regenerative hydraulic motor regulator that adjusts the tilting angle of the regenerative hydraulic motor. When the turning charging condition is satisfied, the controller may control the regenerative hydraulic motor regulator, such that the higher a rotation speed of the turning hydraulic motor, the greater the tilting angle of the regenerative hydraulic motor. This configuration makes it possible to suitably perform energy recovery in accordance with the turning speed.

The regenerative hydraulic motor may be a variable displacement motor whose tilting angle is changeable. The above hydraulic drive system may include a regenerative hydraulic motor regulator that adjusts the tilting angle of the regenerative hydraulic motor. When the boom charging condition is satisfied, the controller may control the regenerative hydraulic motor regulator, such that the more an operation amount of a boom operation valve, the greater the tilting angle of the regenerative hydraulic motor. This configuration makes it possible to suitably perform energy recovery in accordance with the boom lowering speed.

The alternator may be a power generator whose nominal voltage is not less than 30 V. According to this configuration, a large amount of electric power can be stored in the electrical storage device by performing power generation once.

Advantageous Effects of Invention

The present invention makes it possible to regenerate energy while controlling electric power transmission from the alternator to the electrical storage device.

DESCRIPTION OF EMBODIMENTS

Embodiment 1

Figure 1:
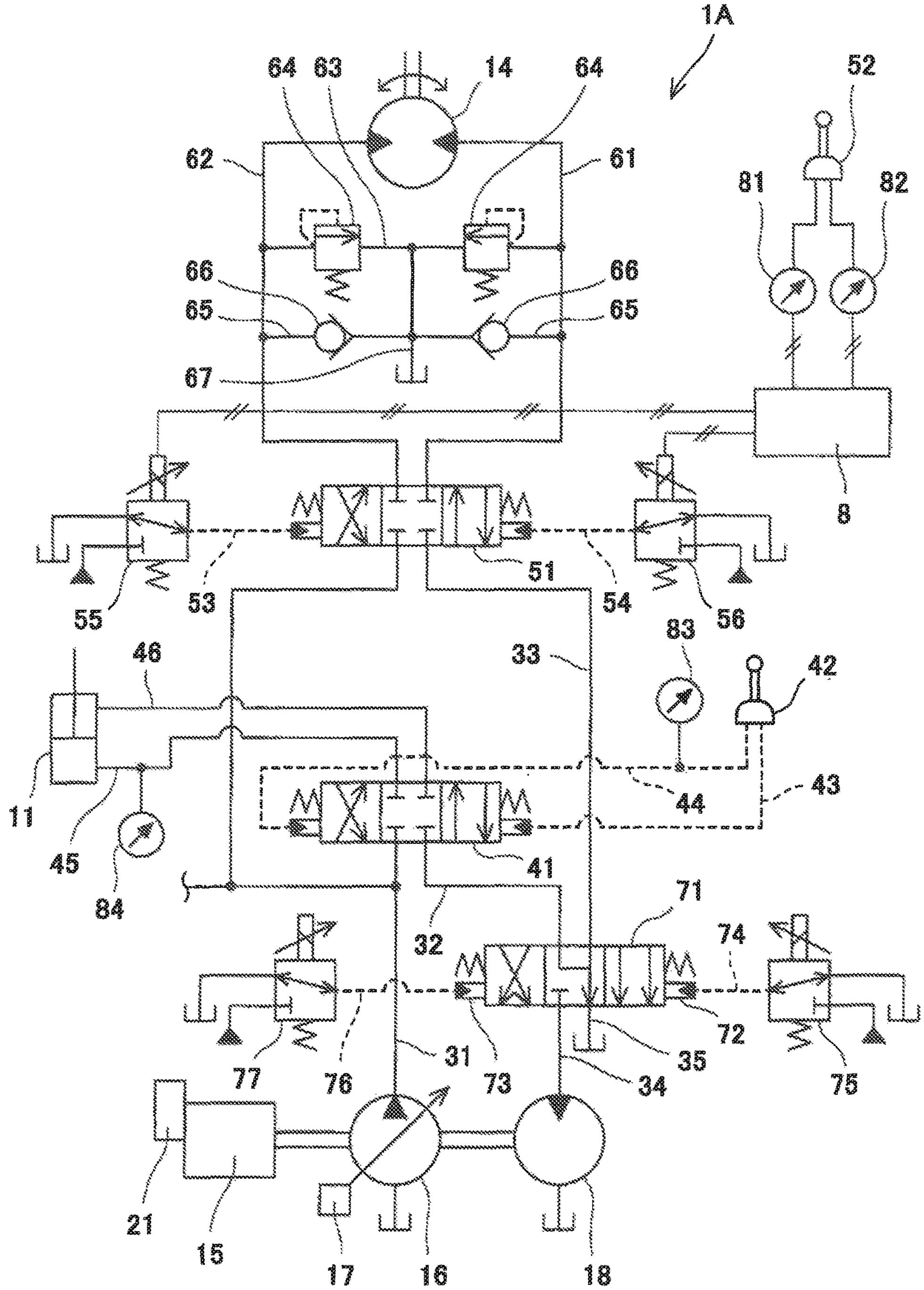
FIG. 1 shows a schematic configuration of a hydraulic drive system according to Embodiment 1 of the present invention.
Figure 2:
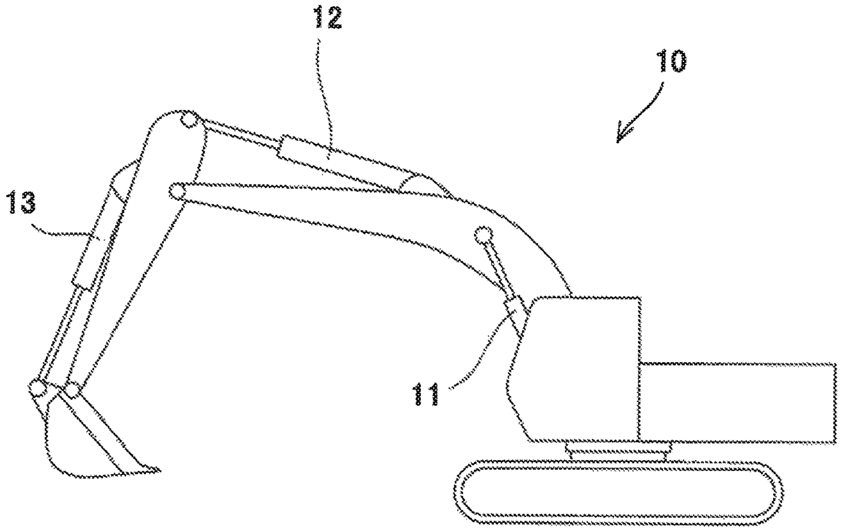
FIG. 2 shows a side view of a hydraulic excavator, which is one example of a construction machine.

FIG. 1 shows a hydraulic drive system 1A of a construction machine according to Embodiment 1 of the present invention. FIG. 2 shows a construction machine 10 in which the hydraulic drive system 1A is installed. Although the construction machine 10 shown in FIG. 2 is a hydraulic excavator, the present invention is applicable to other construction machines, such as a hydraulic crane.

The hydraulic drive system 1A includes, as hydraulic actuators, a boom cylinder 11, an arm cylinder 12, and a bucket cylinder 13, which are shown in FIG. 2, and also a turning hydraulic motor 14 shown in FIG. 1 and a pair of right and left running hydraulic motors that are not shown. The hydraulic drive system 1A further includes: a pump 16, which supplies hydraulic oil to these actuators; and an engine 15, which drives the pump 16. In FIG. 1, actuators other than the turning hydraulic motor 14 and the boom cylinder 11 are omitted for the purpose of simplifying the drawings.

In the present embodiment, the construction machine 10 is a self-propelled hydraulic excavator. In a case where the construction machine 10 is a hydraulic excavator mounted on a ship, a turning unit including an operator cab is turnably supported by the hull of the ship.

The pump 16 is a variable displacement pump (a swash plate pump or a bent axis pump) whose tilting angle is changeable. The tilting angle of the pump 16 is adjusted by a pump regulator 17. The discharge flow rate of the pump 16 may be controlled by negative control or may be controlled by positive control. That is, the pump regulator 17 may operate on hydraulic pressure or may operate on electrical signals.

The pump 16 is connected to a boom control valve 41, a turning control valve 51, and other control valves by a supply line 31. The boom control valve 41 controls supply and discharge of the hydraulic oil to and from the boom cylinder 11, and the turning control valve 51 controls supply and discharge of the hydraulic oil to and from the turning hydraulic motor 14.

To be more specific, the boom control valve 41 is connected to the boom cylinder 11 by a boom raising supply line 45 and a boom lowering supply line 46. The boom control valve 41 is also connected to a regenerative switching valve 71 by a boom discharge line 32. The regenerative switching valve 71 will be described below in detail.

The boom control valve 41 includes a pair of pilot ports. These pilot ports are connected to a boom operation valve 42 by a boom raising pilot line 43 and a boom lowering pilot line 44. The boom operation valve 42 includes an operating lever. The boom operation valve 42 outputs, to the boom control valve 41, a pilot pressure whose magnitude corresponds to an operation amount (angle) of the operating lever.

The turning control valve 51 is connected to the turning hydraulic motor 14 by a left turning supply line 61 and a right turning supply line 62. The turning control valve 51 is also connected to the regenerative switching valve 71 by a turning discharge line 33.

The left turning supply line 61 and the right turning supply line 62 are connected to each other by a bridging passage 63. The bridging passage 63 is provided with a pair of relief valves 64, which are directed opposite to each other. Between the left turning supply line 61 and the right turning supply line 62, bypass passages 65 are provided in a manner to bypass the respective relief valves 64. The bypass passages 65 are provided with respective check valves 66. A tank line 67 is connected to the bridging passage 63 at its portion positioned between the relief valves 64.

The turning control valve 51 includes a pair of pilot ports. One of the pilot ports is connected to a first turning operation proportional valve 55 by a left turning pilot line 53, and the other pilot port is connected to a second turning operation proportional valve 56 by a right turning pilot line 54. Each of the first and second turning operation proportional valves 55 and 56 outputs, to the turning control valve 51, a secondary pressure whose magnitude corresponds to an electric current fed from a controller 8.

The present embodiment adopts a pilot-type turning operation valve 52 including an operating lever for turning operation. The turning operation valve 52 outputs a pilot pressure whose magnitude corresponds to an operation amount (angle) of the operating lever. The controller 8 is connected to: a first pressure meter 81, which measures a left turning pilot pressure PL outputted from the turning operation valve 52; and a second pressure meter 82, which measures a right turning pilot pressure PR outputted from the turning operation valve 52. At a normal time (i.e., when energy at turning deceleration is not regenerated), the controller 8 feeds an electric current proportional to the pilot pressure (PL or PR) outputted from the turning operation valve 52 to the turning operation proportional valve (55 or 56). In response, the turning operation proportional valve (55 or 56) outputs a secondary pressure corresponding to the pilot pressure (PL or PR) outputted from the turning operation valve 52. However, as an alternative, the turning operation valve 52 may be an electrical operation valve that directly outputs, as a turning signal, an electrical signal whose magnitude corresponds to an operation amount (angle) of the operating lever to the controller 8.

In addition, in the present embodiment, the hydraulic drive system 1A is configured such that both energy at boom lowering and energy at turning deceleration can be regenerated. As a configuration for the energy regeneration, the hydraulic drive system 1A includes a regenerative hydraulic motor 18 and the aforementioned regenerative switching valve 71.

The regenerative hydraulic motor 18 is coupled to the pump 16. In the present embodiment, the regenerative hydraulic motor 18 is a fixed displacement motor.

The regenerative switching valve 71 is connected to the regenerative hydraulic motor 18 by a regenerative line 34. Also, a tank line 35 is connected to the regenerative switching valve 71. The regenerative switching valve 71 is switched among a neutral position, a boom regenerative position (right-side position in FIG. 1), and a turning regenerative position (left-side position in FIG. 1).

When the regenerative switching valve 71 is in the neutral position, the boom discharge line 32 and the turning discharge line 33 communicate with the tank line 35. As a result, the hydraulic oil discharged from the boom cylinder 11 and the hydraulic oil discharged from the turning hydraulic motor 14 are led to the tank. When the regenerative switching valve 71 is in the boom regenerative position, the turning discharge line 33 communicates with the tank line 35, whereas the boom discharge line 32 communicates with the regenerative line 34. As a result, the hydraulic oil discharged from the boom cylinder 11 is led to the regenerative hydraulic motor 18. When the regenerative switching valve 71 is in the turning regenerative position, the boom discharge line 32 communicates with the tank line 35, whereas the turning discharge line 33 communicates with the regenerative line 34. As a result, the hydraulic oil discharged from the turning hydraulic motor 14 is led to the regenerative hydraulic motor 18.

In the present embodiment, the regenerative switching valve 71 is a pilot-type variable throttle capable of changing, when in the boom regenerative position, the degree of communication between the boom discharge line 32 and the regenerative line 34 and the degree of communication between the boom discharge line 32 and the tank line 35, and also capable of changing, when in the turning regenerative position, the degree of communication between the turning discharge line 33 and the regenerative line 34 and the degree of communication between the turning discharge line 33 and the tank line 35. However, as an alternative, the regenerative switching valve 71 may be a solenoid variable throttle.

Specifically, the regenerative switching valve 71 includes: a boom regenerative pilot port 72 for switching the regenerative switching valve 71 to the boom regenerative position; and a turning regenerative pilot port 73 for switching the regenerative switching valve 71 to the turning regenerative position. However, as an alternative, the regenerative switching valve 71 may be merely a pilot-type or solenoid on-off valve that allows, when in the boom regenerative position or the turning regenerative position, the discharge line (32 or 33) to fully communicate with the regenerative line 34.

The boom regenerative pilot port 72 is connected to a boom regenerative operation proportional valve 75 by a boom regenerative pilot line 74. The turning regenerative pilot port 73 is connected to a turning regenerative operation proportional valve 77 by a turning regenerative pilot line 76. Each of the boom regenerative operation proportional valve 75 and the turning regenerative operation proportional valve 77 outputs, to the regenerative switching valve 71, a secondary pressure whose magnitude corresponds to an electric current fed from the controller 8.

Figure 3:
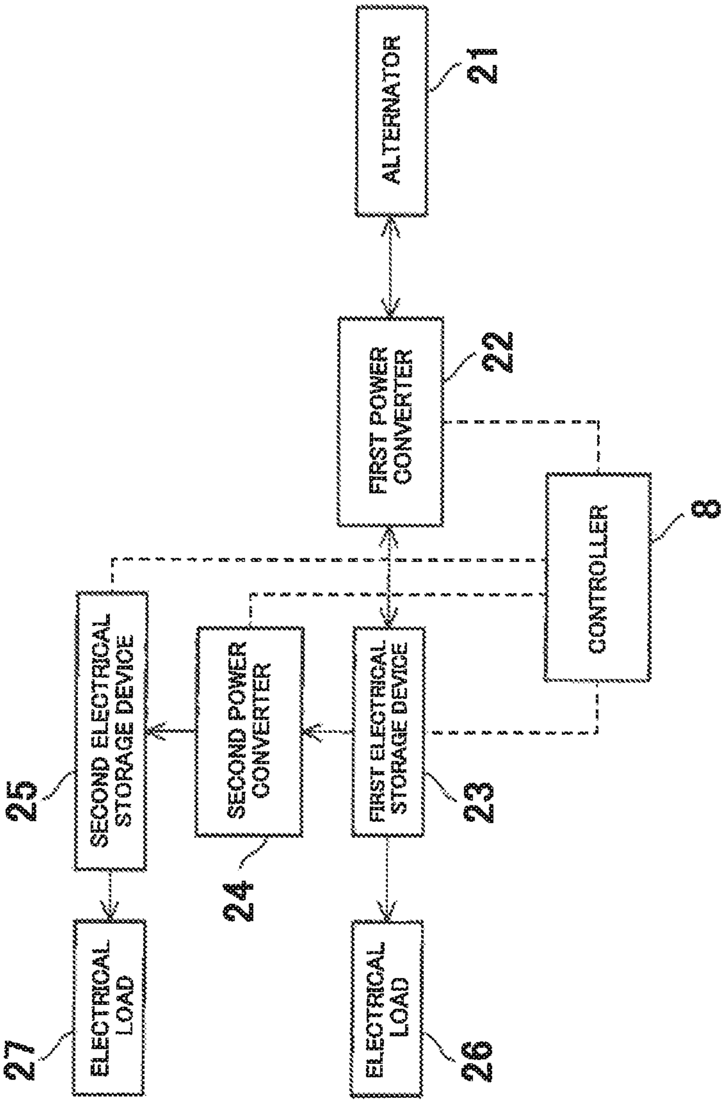
FIG. 3 is a block diagram showing electrical devices in the hydraulic drive system of FIG. 1.
Figure 4:
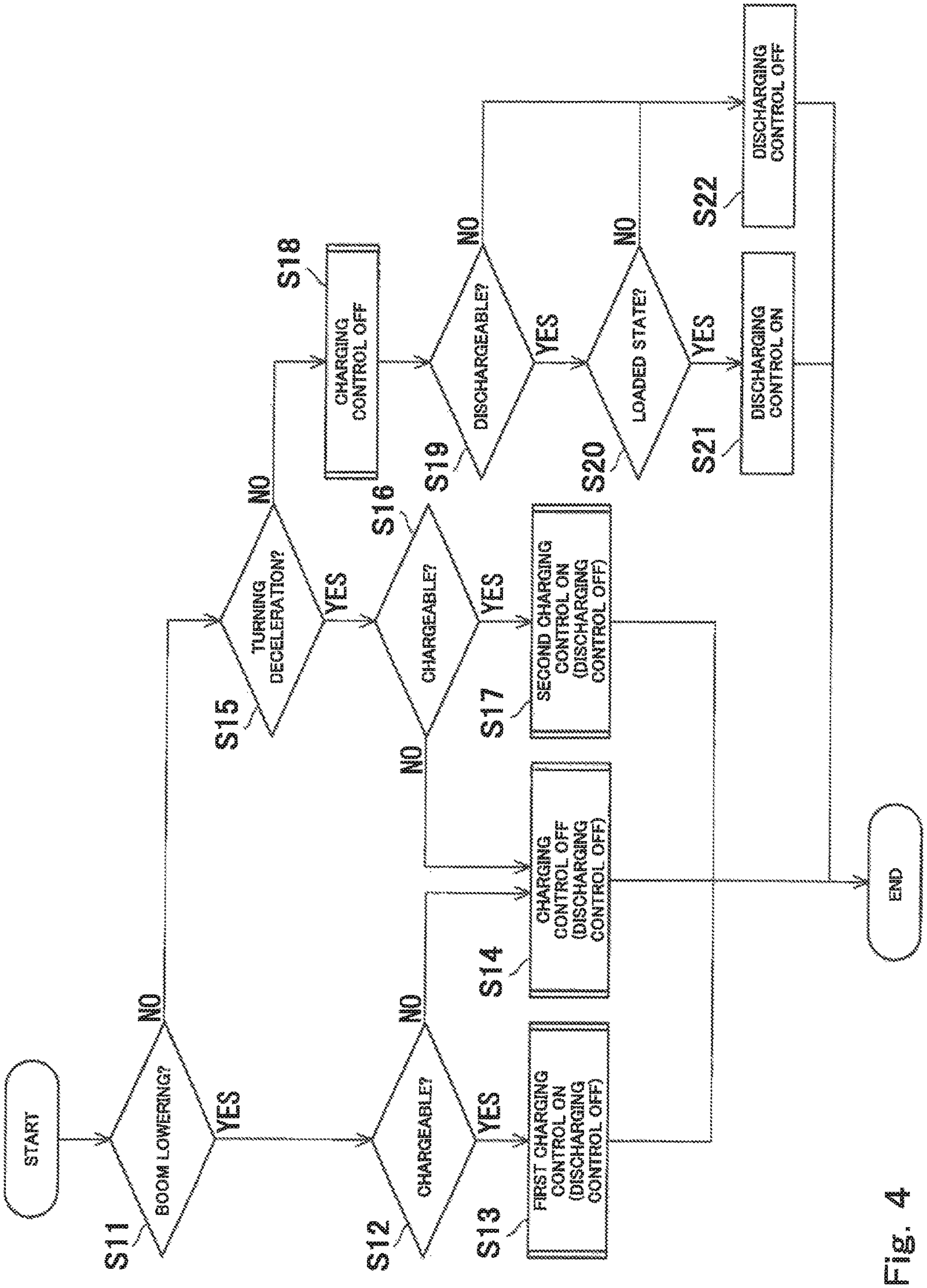
FIG. 4 is a flowchart of control performed by a controller of the hydraulic drive system of FIG. 1.

An alternator 21 is mounted to the aforementioned engine 15. As shown in FIG. 3, a first electrical storage device 23 is connected to the alternator 21, and a second electrical storage device 25 is connected to the first electrical storage device 23. The voltage of the first electrical storage device 23 (which is a capacitor, for example) is a voltage (e.g., 48 V) slightly higher than the voltage of an ordinary electrical component. The voltage of the second electrical storage device 25 (which is a battery, for example) is equivalent to the voltage of an ordinary electrical component (e.g., 24 V). A medium-voltage electrical load 26 is connected to the first electrical storage device 23, and a low-voltage electrical load 27 is connected to the second electrical storage device 25.

A first power converter 22 for power control (e.g., an inverter) is interposed between the alternator 21 and the first electrical storage device 23. A second power converter 24 for voltage conversion is interposed between the first electrical storage device 23 and the second electrical storage device 25.

The alternator 21 includes a rotary shaft (not shown) connected to the output shaft of the engine 15 via a motive power transmitter, such as a belt. The alternator 21 is operable to rotate the output shaft of the engine 15 when electric power is supplied to the alternator 21. For example, the alternator 21 is a power generator whose nominal voltage is not less than 30 V (e.g., 48 V). Accordingly, a large amount of electric power can be stored in the first electrical storage device 23 by performing power generation once. However, as an alternative, the nominal voltage of the alternator 21 may be less than 30 V. In the present embodiment, the alternator 21 is an AC power generator. Accordingly, the first power converter 22 serves also as an AC-DC converter.

The first power converter 22 is switched between a servo-on state and a servo-off state. When in the servo-on state, the first power converter 22 enables electric power transmission between the alternator 21 and the first electrical storage device 23. When in the servo-off state, the first power converter 22 disables electric power transmission between the alternator 21 and the first electrical storage device 23. The controller 8 switches the first power converter 22 to either the servo-on state or the servo-off state. When the controller 8 switches the first power converter 22 to the servo-on state, the controller 8 controls the first power converter 22 either in a charging mode of adjusting electric power transmitted from the alternator 21 to the first electrical storage device 23 or in a discharging mode of adjusting electric power transmitted from the first electrical storage device 23 to the alternator 21.

As described above, the controller 8 controls the first and second turning operation proportional valves 55 and 56, the boom regenerative operation proportional valve 75, the turning regenerative operation proportional valve 77, and the first power converter 22. Specifically, the controller 8 is connected to the aforementioned first and second pressure meters 81 and 82 and third and fourth pressure meters 83 and 84. The third pressure meter 83 measures a pilot pressure outputted from the boom operation valve 42 at the time of boom lowering, and the fourth pressure meter 84 measures the pressure of the boom raising supply line 45.

Next, control performed by the controller 8 is described with reference to FIG. 4 and FIGS. 5A to 5C. In the present embodiment, the controller 8 controls the regenerative switching valve 71 via the boom regenerative operation proportional valve 75 and the turning regenerative operation proportional valve 77, such that energy at boom lowering is regenerated in priority to energy at turning deceleration. In the present embodiment, when either a boom charging condition or a turning charging condition is satisfied, the controller 8 switches the first power converter 22 to the servo-on state and controls the first power converter 22 in the charging mode. When neither the boom charging condition nor the turning charging condition is satisfied, the controller 8 either switches the first power converter 22 to the servo-off state, or switches the first power converter 22 to the servo-on state and controls the first power converter 22 in the discharging mode.

First, the controller 8 determines whether or not boom lowering is being performed (i.e., whether or not the pilot pressure measured by the third pressure meter 83 is higher than zero) (step S11). If it is determined YES in step S11, the flow proceeds to step S12. If it is determined NO in step S11, the flow proceeds to step S15.

In step S12, the controller 8 determines whether or not charging of the first electrical storage device 23 is performable based on, for example, the amount of electric power stored in the first electrical storage device 23. If it is determined YES in step S12, the controller 8 carries out a first charging control ON process (step S13). If it is determined NO in step S12, the controller 8 carries out a charging control OFF process (step S14). Determining YES in step S12 is the boom charging condition, i.e., a condition that boom lowering be currently performed and the first electrical storage device 23 be currently in a chargeable state.

On the other hand, in step S15, the controller 8 determines whether or not turning deceleration is being performed (i.e., whether or not the left turning pilot pressure PL measured by the first pressure meter 81 or the right turning pilot pressure PR measured by the second pressure meter 82 decreases). If it is determined YES in step S15, the flow proceeds to step S16. If it is determined NO in step S15, the flow proceeds to step S18.

In step S16, the controller 8 determines whether or not charging of the first electrical storage device 23 is performable based on, for example, the amount of electric power stored in the first electrical storage device 23. If it is determined YES in step S16, the controller 8 carries out a second charging control ON process (step S17). If it is determined NO in step S16, the controller 8 carries out the charging control OFF process (step S14). Determining YES in step S16 is the turning charging condition, i.e., a condition that turning deceleration be currently performed and the first electrical storage device 23 be currently in a chargeable state.

Figure 5C:
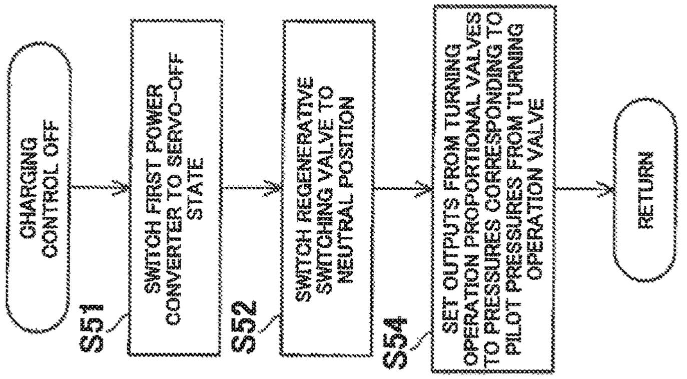
FIGS. 5A to 5C show respective subroutines of first charging control ON, second charging control ON, and charging control OFF processes shown in FIG. 4.
Figure 5B:
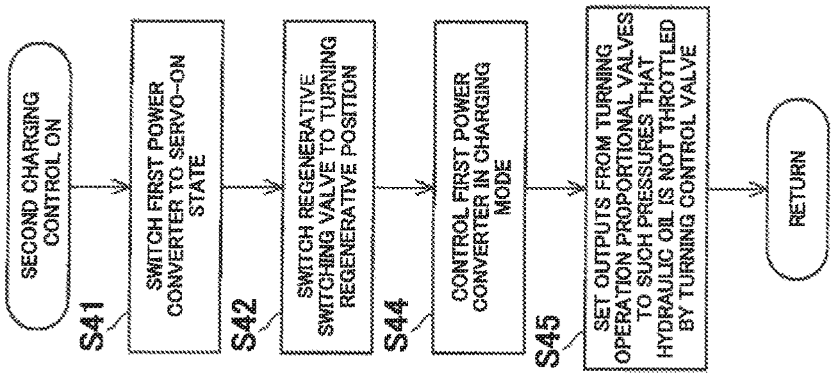
Figure 5A:
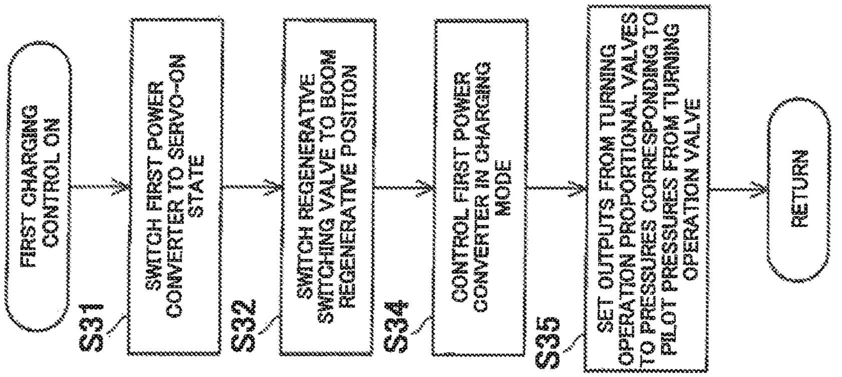
Figure 6:
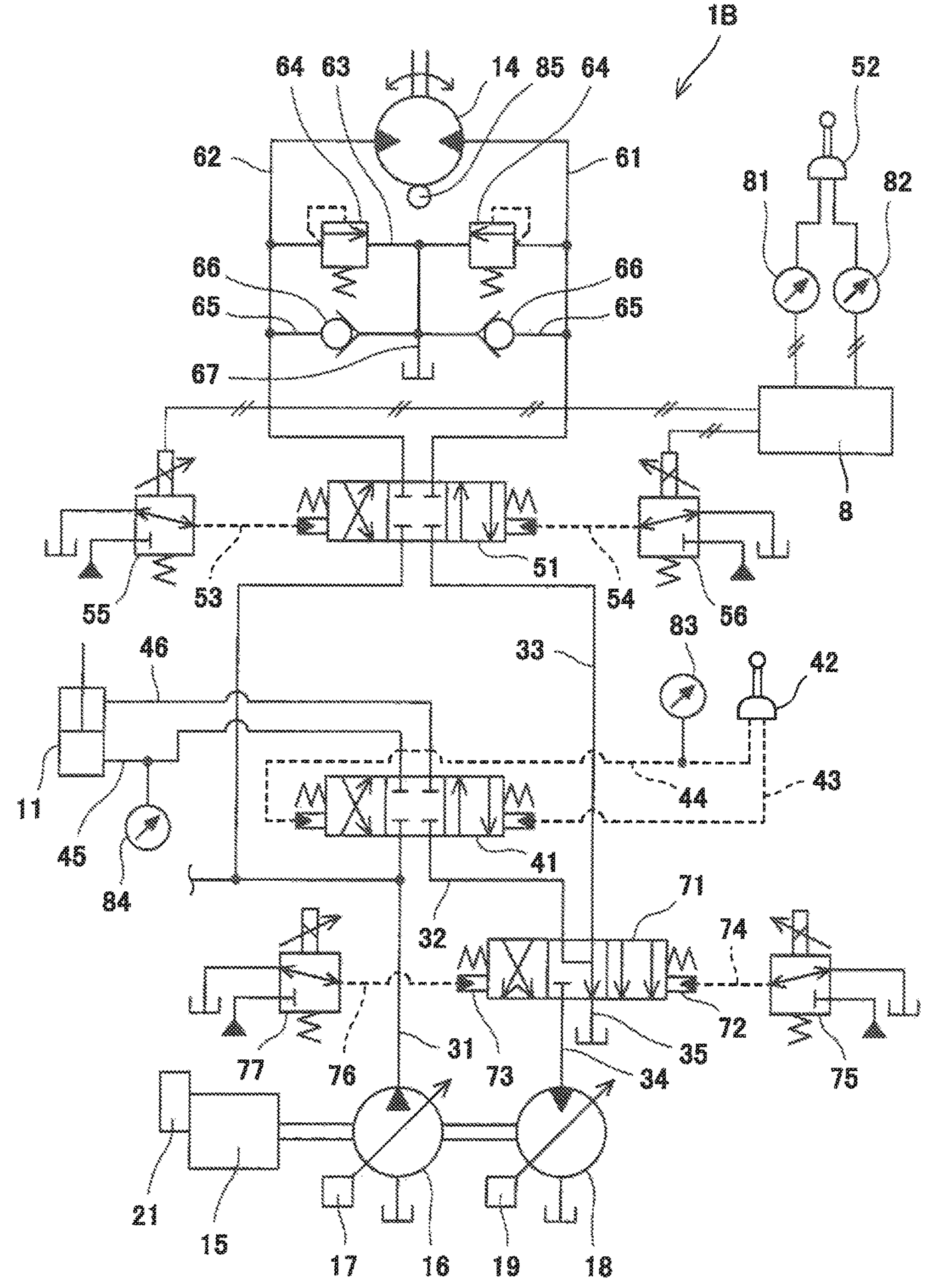
FIG. 6 shows a schematic configuration of a hydraulic drive system according to Embodiment 2 of the present invention.

In the first charging control ON process in the case where the boom charging condition is satisfied, as shown in FIG. 5A, first, the controller 8 switches the first power converter 22 to the servo-on state (step S31). Then, the controller 8 feeds an electric current having a predetermined magnitude to the boom regenerative operation proportional valve 75, thereby switching the regenerative switching valve 71 to the boom regenerative position (step S32). The magnitude of the electric current fed from the controller 8 to the boom regenerative operation proportional valve 75 at the time is determined based on, for example, the pressure of the boom lowering pilot line 44 measured by the third pressure meter 83. Thereafter, the controller 8 controls the first power converter 22 in the charging mode (step S34).

As a result of performing steps S31, S32, and S34, energy recovered by the regenerative hydraulic motor 18 at the time of boom lowering can be stored in the first electrical storage device 23 as electrical energy. During the first charging control ON process being carried out, the controller 8 feeds an electric current proportional to the pilot pressure (PL or PR) outputted from the turning operation valve 52 to the turning operation proportional valve (55 or 56), thereby setting the outputs from the respective first and second turning operation proportional valves 55 and 56 to pressures corresponding to the pilot pressures PL and PR outputted from the turning operation valve 52 (step S35).

Even at the time of boom lowering, in the charging control OFF process in the case where the first electrical storage device 23 is un-chargeable, as shown in FIG. 5C, first, the controller 8 switches the first power converter 22 to the servo-off state (step S51). Then, the controller 8 switches the regenerative switching valve 71 to the neutral position while feeding no electric current to the boom regenerative operation proportional valve 75 and the turning regenerative operation proportional valve 77 (step S52). Similar to the case of the first charging control ON process being carried out, during the charging control OFF process being carried out, the controller 8 sets the outputs from the respective first and second turning operation proportional valves 55 and 56 to pressures corresponding to the pilot pressures outputted from the turning operation valve 52 (step S54).

In the second charging control ON process in the case where the turning charging condition is satisfied, as shown in FIG. 5B, first, the controller 8 switches the first power converter 22 to the servo-on state (step S41). Then, the controller 8 feeds an electric current having a predetermined magnitude to the turning regenerative operation proportional valve 77, thereby switching the regenerative switching valve 71 to the turning regenerative position (step S42). The magnitude of the electric current fed from the controller 8 to the turning regenerative operation proportional valve 77 at the time is determined based on, for example, the rotation speed of the engine 15. Thereafter, the controller 8 controls the first power converter 22 in the charging mode (step S44).

As a result of performing steps S41, S42, and S44, energy recovered by the regenerative hydraulic motor 18 at the time of turning deceleration can be stored in the first electrical storage device 23 as electrical energy. During the second charging control ON process being carried out, the controller 8 sets the outputs from the respective first and second turning operation proportional valves 55 and 56 to such pressures that the hydraulic oil is not throttled by the turning control valve 51 (step S45). For example, the controller 8 feeds an electric current to the first turning operation proportional valve 55 or the second turning operation proportional valve 56, such that the area of opening of the turning control valve 51 is maximized. Alternatively, during the second charging control ON process being carried out, the controller 8 may keep the electric current from before the turning deceleration so that the position of the turning control valve 51 will not change.

Even at the time of turning deceleration, in the charging control OFF process in the case where the first electrical storage device 23 is un-chargeable, the above-described control in accordance with the flow shown in FIG. 5C is performed.

In the case where neither boom lowering nor turning deceleration is being performed, the controller 8 carries out the charging control OFF process (step S18), the flow of which is as shown in FIG. 5C. However, in the case where neither boom lowering nor turning deceleration is being performed, an additional process is carried out after the charging control OFF process.

First, the controller 8 determines whether or not discharging from the first electrical storage device 23 is performable based on, for example, the amount of electric power stored in the first electrical storage device 23 (step S19). If it is determined NO in step S19, the controller 8 carries out a discharging control OFF process (step S22). Specifically, the controller 8 keeps the first power converter 22 in the servo-off state.

If it is determined YES in step S19, the controller 8 further determines whether or not the current state is a loaded state (step S20). Whether or not the current state is a loaded state can be determined based on, for example, the discharge pressure of the pump 16 and an instruction given to the pump regulator 17. If it is determined NO in step S20, the flow proceeds to step S22. On the other hand, if it is determined YES in step S20, the controller 8 carries out a discharging control ON process (step S21). Specifically, the controller 8 switches the first power converter 22 to the servo-on state and controls the first power converter 22 in the discharging mode. This makes it possible to assist the driving of the pump 16 by utilizing the electric power stored in the first electrical storage device 23.

As described above, in the hydraulic drive system 1A of the present embodiment, the regenerative hydraulic motor 18 is coupled to the pump 16 driven by the engine 15. Therefore, by utilizing the alternator 21 mounted to the engine 15, in other words, without additionally installing a motor generator at the pump 16 side (load side) as seen from the engine 15, the energy recovered by the regenerative hydraulic motor 18 can be stored in the first electrical storage device 23 as electrical energy. Moreover, since the first power converter 22 is interposed between the alternator 21 and the first electrical storage device 23, electric power transmission from the alternator 21 to the first electrical storage device 23 can be controlled.

<Variations>

In the above-described embodiment, in both the charging control OFF process (step S14) at the time of boom lowering and the charging control OFF process (step S14) at the time of turning deceleration, the regenerative switching valve 71 is switched to the neutral position. However, as an alternative, the regenerative switching valve 71 may be always kept to the boom regenerative position at the time of boom lowering, and may be always kept to the turning regenerative position at the time of turning deceleration. This makes it possible to assist the driving of the pump 16 by utilizing the energy recovered by the regenerative hydraulic motor 18 instead of storing electric power in the first electrical storage device 23.

The regenerative switching valve 71 need not be a single three-position valve, but may be configured as a pair of two-position valves, i.e., a boom-side two-position valve to which the boom discharge line 32 is connected and a turning-side two-position valve to which the turning discharge line 33 is connected.

In the above-described embodiment, the hydraulic drive system 1A is configured such that both energy at boom lowering and energy at turning deceleration can be regenerated. However, the hydraulic drive system 1A may be configured such that only one of the energy at boom lowering or the energy at turning deceleration can be regenerated. That is, instead of the discharge line (32 or 33), a tank line may be connected to the boom control valve 41 or the turning control valve 51. In this case, of course, the regenerative switching valve 71 is a two-position valve.

For example, in a case where only the hydraulic oil discharged from the boom cylinder 11 at the time of boom lowering is led to the regenerative hydraulic motor 18, when the boom charging condition is satisfied, the controller 8 may switch the first power converter 22 to the servo-on state and control the first power converter 22 in the charging mode, and when the boom charging condition is not satisfied, the controller 8 may either switch the first power converter 22 to the servo-off state, or switch the first power converter 22 to the servo-on state and control the first power converter 22 in the discharging mode.

Embodiment 2

Hereinafter, a hydraulic drive system 1B of a construction machine according to Embodiment 2 of the present invention is described with reference to FIG. 6 and FIGS. 7A to 7C. It should be noted that, in the present embodiment, the same components as those described in Embodiment 1 are denoted by the same reference signs as those used in Embodiment 1, and repeating the same descriptions is avoided.

In the present embodiment, the regenerative hydraulic motor 18 is a variable displacement motor (a swash plate motor or a bent axis motor) whose tilting angle is changeable. The tilting angle of the regenerative hydraulic motor 18 is adjusted by a regenerative hydraulic motor regulator 19. In the present embodiment, the regenerative hydraulic motor regulator 19 operates on an electrical signal. That is, the regenerative hydraulic motor regulator 19 is controlled by the controller 8. For example, in a case where the regenerative hydraulic motor 18 is a swash plate motor, the regenerative hydraulic motor regulator 19 may electrically change hydraulic pressure applied to a spool coupled to the swash plate of the motor, or the regenerative hydraulic motor regulator 19 may be an electrical actuator coupled to the swash plate of the motor.

Figure 7A:
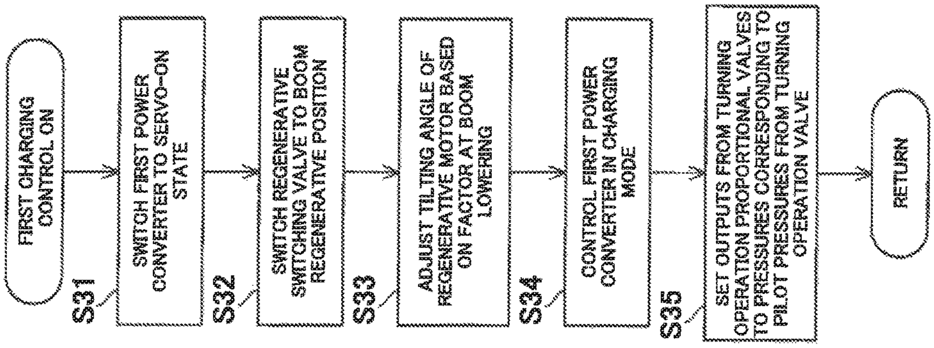
FIGS. 7A to 7C show respective subroutines of first charging control ON, second charging control ON, and charging control OFF processes according to Embodiment 2.
Figure 7B:
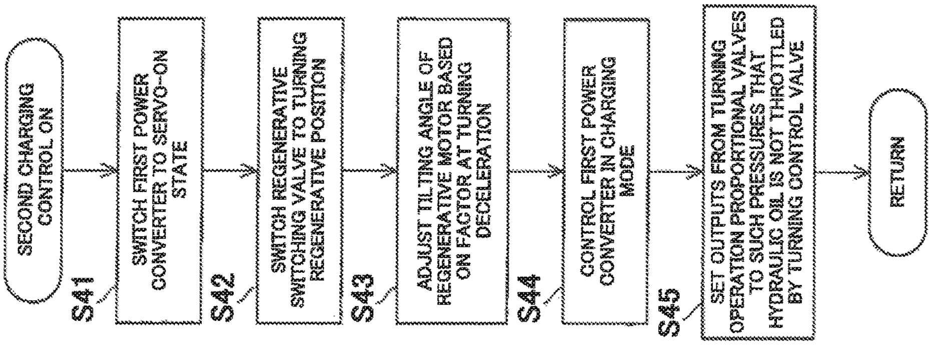
Figure 7C:
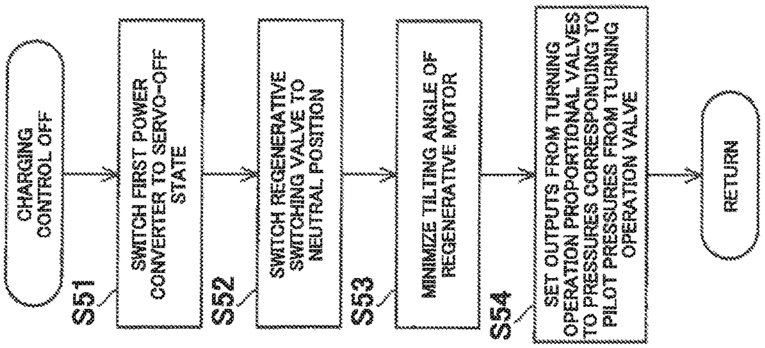

In the present embodiment, the controller 8 is connected to a rotation speed meter 85, which measures the rotation speed of the turning hydraulic motor 14. Similar to Embodiment 1, the controller 8 performs control in accordance with the flowchart shown in FIG. 4. In addition, as shown in FIGS. 7A to 7C, the controller 8 controls the regenerative hydraulic motor regulator 19 in the first charging control ON process (step S13 of FIG. 4), the second charging control ON process (step S17 of FIG. 4), and the charging control OFF process (step S14, S18 of FIG. 4).

In the first charging control ON process, after step S32 and before step S34, the controller 8 adjusts the tilting angle of the regenerative hydraulic motor 18 via the regenerative hydraulic motor regulator 19 based on a factor at boom lowering (step S33). For example, the controller 8 controls the regenerative hydraulic motor regulator 19, such that the more the operation amount of the boom operation valve 42, the greater the tilting angle of the regenerative hydraulic motor 18. This makes it possible to suitably perform energy recovery in accordance with the boom lowering speed. As the operation amount of the boom operation valve 42, the pressure of the boom lowering pilot line 44 measured by the third pressure meter 83 may be used, or alternatively, the pressure of the boom raising supply line 45 measured by the fourth pressure meter 84 may be used.

In the second charging control ON process, after step S42 and before step S44, the controller 8 adjusts the tilting angle of the regenerative hydraulic motor 18 via the regenerative hydraulic motor regulator 19 based on a factor at turning deceleration (step S43). For example, the controller 8 controls the regenerative hydraulic motor regulator 19, such that the higher the rotation speed of the turning hydraulic motor 14 measured by the rotation speed meter 85, the greater the tilting angle of the regenerative hydraulic motor 18. This makes it possible to suitably perform energy recovery in accordance with the turning speed. It should be noted that, in a case where the rotation speed meter 85 is installed as in the present embodiment, the magnitude of the electric current fed from the controller 8 to the turning regenerative operation proportional valve 77 in step S42 may be determined based on the rotation speed of the turning hydraulic motor 14 measured by the rotation speed meter 85.

In the charging control OFF process, after step S52 and before step S54, the controller 8 controls the regenerative hydraulic motor regulator 19, such that the tilting angle of the regenerative hydraulic motor 18 is minimized (step S53).

The present embodiment provides the same advantageous effects as those provided by Embodiment 1.

Embodiment 3

Figure 8:
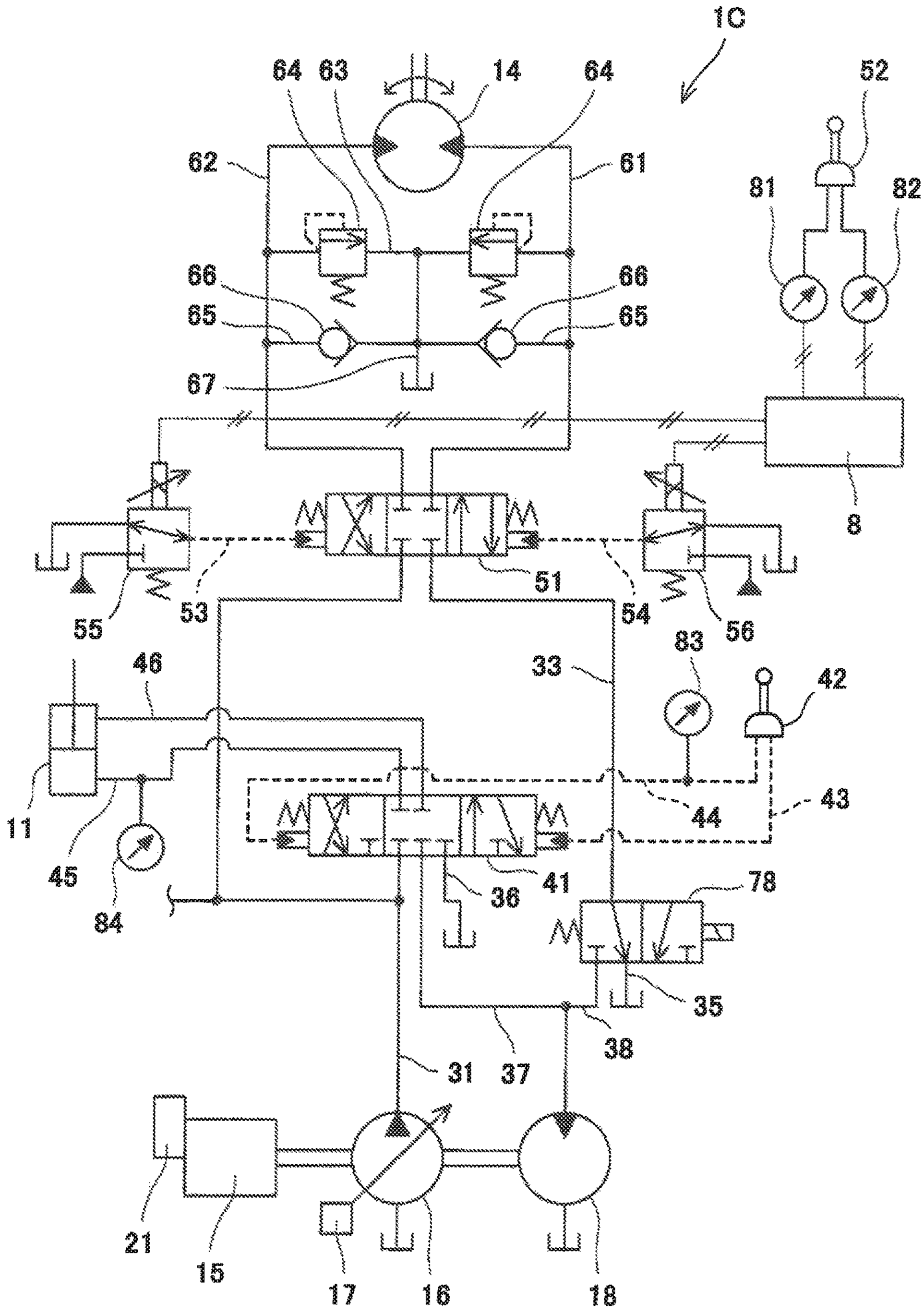
FIG. 8 shows a schematic configuration of a hydraulic drive system according to Embodiment 3 of the present invention.

Next, a hydraulic drive system 1C of a construction machine according to Embodiment 3 of the present invention is described with reference to FIG. 8. It should be noted that, in the present embodiment, the same components as those described in Embodiments 1 and 2 are denoted by the same reference signs as those used in Embodiments 1 and 2, and repeating the same descriptions is avoided.

In the present embodiment, the boom control valve 41 is connected to the regenerative hydraulic motor 18 by a boom discharge line 37, and a tank line 36 is connected to the boom control valve 41. The boom control valve 41 is configured such that, at the time of boom raising, the hydraulic oil discharged from the boom cylinder 11 flows into the tank line 36 through the boom control valve 41, and at the time of boom lowering, the hydraulic oil discharged from the boom cylinder 11 flows into the discharge line 37 through the boom control valve 41. With this configuration, at the time of boom lowering, the hydraulic oil discharged from the boom cylinder 11 can be automatically led to the regenerative hydraulic motor 18.

To be more specific, when the boom control valve 41 moves in the boom raising direction, the supply line 31 comes into communication with the boom raising supply line 45, and the boom lowering supply line 46 comes into communication with the tank line 36. On the other hand, when the boom control valve 41 moves in the boom lowering direction, the supply line 31 comes into communication with the boom lowering supply line 46, and the boom raising supply line 45 comes into communication with the boom discharge line 37.

In the present embodiment, the turning control valve 51 is connected to a regenerative switching valve 78 by the turning discharge line 33. The regenerative switching valve 78 is connected to the boom discharge line 37 by a regenerative line 38. The tank line 35 is connected to the regenerative switching valve 78.

The regenerative switching valve 78 is switched between a non-regenerative position and a regenerative position. When the regenerative switching valve 78 is in the non-regenerative position, the turning discharge line 33 communicates with the tank line 35. When the regenerative switching valve 78 is in the regenerative position, the turning discharge line 33 communicates with the regenerative line 38. In the present embodiment, the regenerative switching valve 78 is a solenoid on-off valve driven by the controller 8. Also in the present embodiment, energy at boom lowering is regenerated in priority to energy at turning deceleration. That is, even at the time of turning deceleration, if boom lowering is being performed, then the controller 8 keeps the regenerative switching valve 78 in the non-regenerative position. On the other hand, at the time of turning deceleration, if boom lowering is not being performed, then the controller 8 switches the regenerative switching valve 78 to the regenerative position. It should be noted that, similar to Embodiment 1, the controller 8 performs control in accordance with the flowcharts shown in FIGS. 4 and 5A to 5C, except the control of the regenerative switching valve 78.

The present embodiment provides the same advantageous effects as those provided by Embodiment 1.

Figure 9:
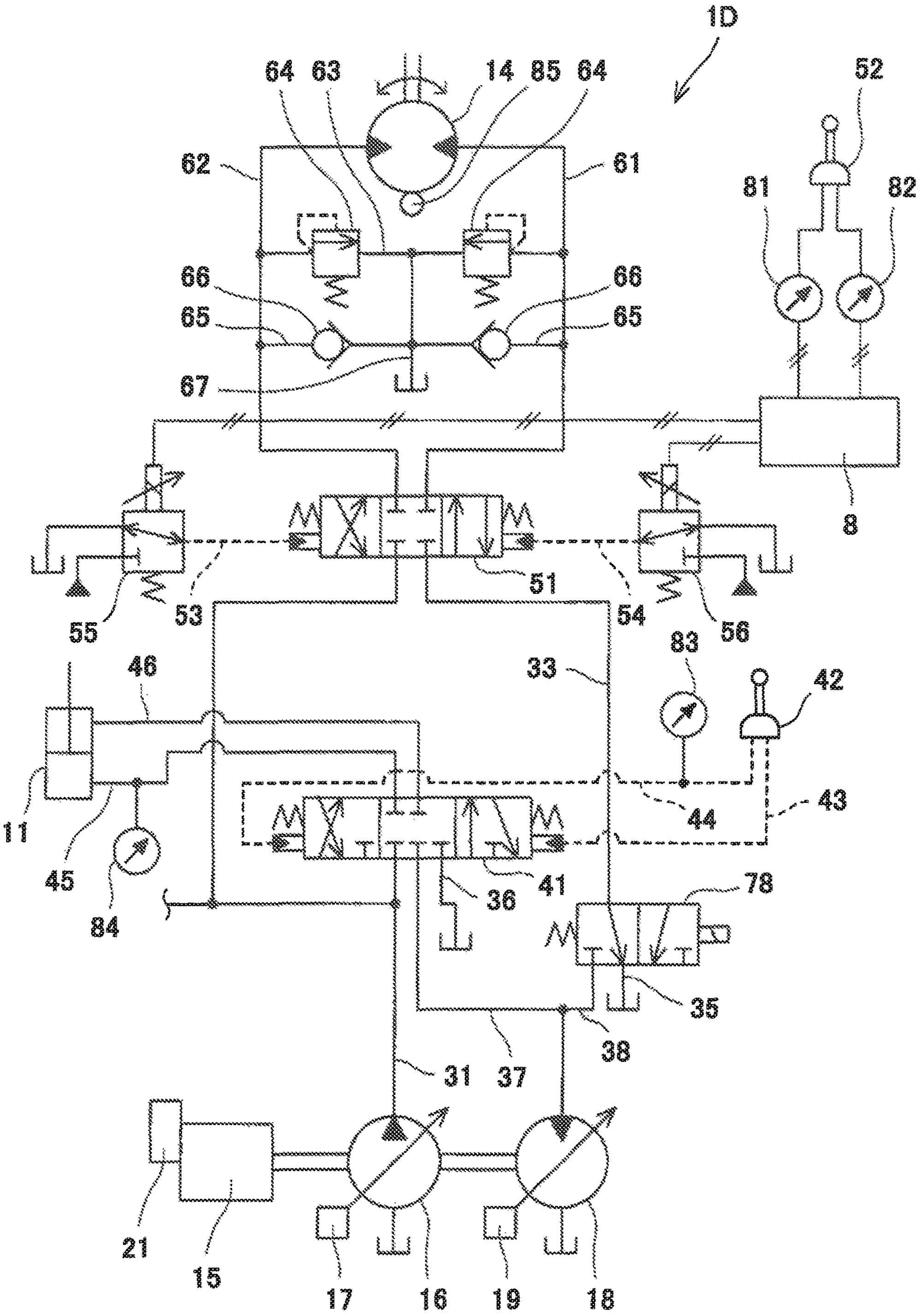
FIG. 9 shows a schematic configuration of a hydraulic drive system according to one variation of Embodiment 3.

Of course, it is understood that, as in a hydraulic drive system 1D according to one variation shown in FIG. 9, the regenerative hydraulic motor 18 may be a variable displacement motor, and the rotation speed meter 85 measuring the rotation speed of the turning hydraulic motor 14 may be installed, similar to Embodiment 2.

Embodiment 4

Figure 10:
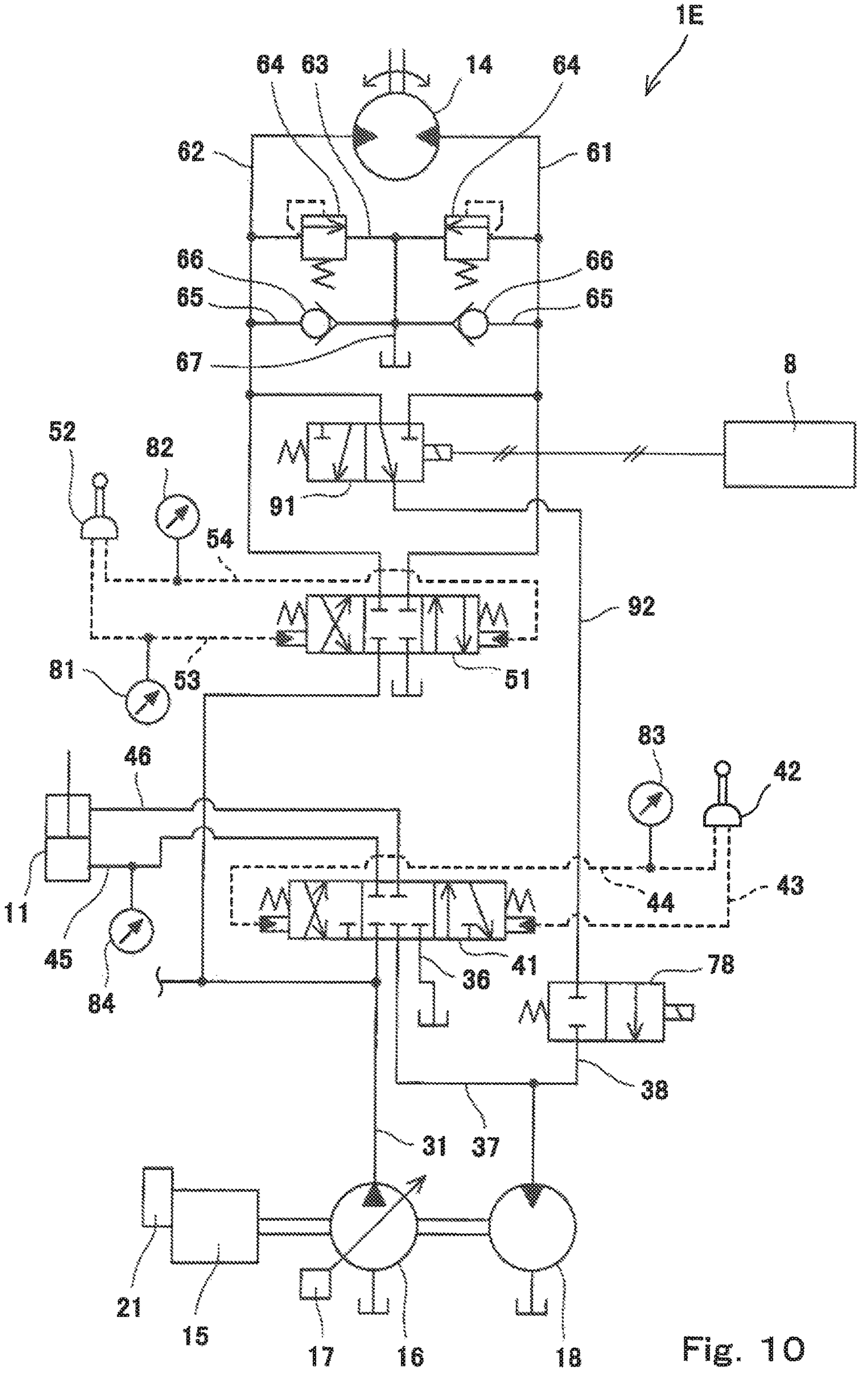
FIG. 10 shows a schematic configuration of a hydraulic drive system according to Embodiment 4 of the present invention.

Next, a hydraulic drive system 1E of a construction machine according to Embodiment 4 of the present invention is described with reference to FIG. 10. It should be noted that, in the present embodiment, the same components as those described in Embodiments 1 to 3 are denoted by the same reference signs as those used in Embodiments 1 to 3, and repeating the same descriptions is avoided.

In the present embodiment, the pilot ports of the turning control valve 51 are connected to the turning operation valve 52 by the left turning pilot line 53 and the right turning pilot line 54. That is, the turning control valve 51 moves always in accordance with an operation amount (angle) of the operating lever of the turning operation valve 52.

In the present embodiment, a switching valve 91 for selecting one of the turning supply lines 61 and 62 is provided between the left turning supply line 61 and the right turning supply line 62. The switching valve 91 is connected to the regenerative switching valve 78 by a turning discharge line 92.

In the present embodiment, the switching valve 91 is a solenoid on-off valve driven by the controller 8. However, as an alternative, the switching valve 91 may be merely a high pressure selective valve. The controller 8 switches the switching valve 91 to a first position at the time of left turning deceleration and to a second position at the time of right turning deceleration. When the switching valve 91 is in the first position, the right turning supply line 62 at the discharge side communicates with the discharge line 92. When the switching valve 91 is in the second position, the left turning supply line 61 at the discharge side communicates with the discharge line 92. Except at the time of turning deceleration, it does not matter whether the switching valve 91 is positioned in the first position or in the second position.

In Embodiment 2, the regenerative switching valve 78 has three ports. However, in the present embodiment, the regenerative switching valve 78 has two ports. That is, the tank line 35 (see FIG. 6) is not connected to the regenerative switching valve 78. When in the non-regenerative position, the regenerative switching valve 78 blocks the turning discharge line 92 and the regenerative line 38. When in the regenerative position, the regenerative switching valve 78 allows the turning discharge line 92 to be in communication with the regenerative line 38.

Similar to Embodiment 3, even at the time of turning deceleration, if boom lowering is being performed, then the controller 8 keeps the regenerative switching valve 78 in the non-regenerative position. On the other hand, at the time of turning deceleration, if boom lowering is not being performed, then the controller 8 switches the regenerative switching valve 78 to the regenerative position. It should be noted that, similar to Embodiment 1, the controller 8 performs control in accordance with the flowcharts shown in FIGS. 4 and 5A to 5C, except that the control of the switching valve 91 and the regenerative switching valve 78 and the control of the turning operation proportional valves are not performed.

The present embodiment provides the same advantageous effects as those provided by Embodiment 1. In addition, in the present embodiment, the pilot circuit between the turning operation valve 52 and the turning control valve 51 can be made an ordinary simple circuit configuration.

Figure 11:
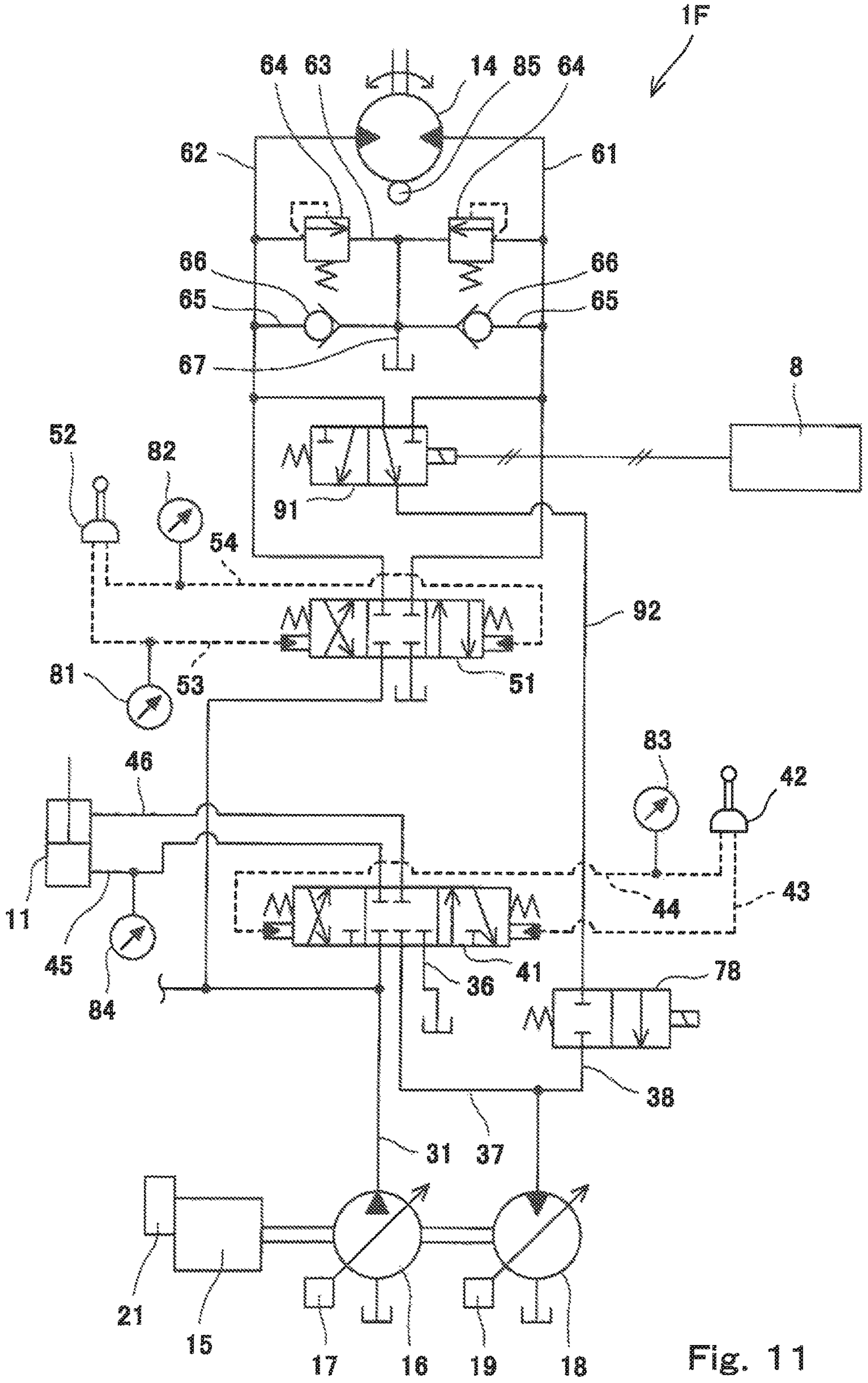
FIG. 11 shows a schematic configuration of a hydraulic drive system according to one variation of Embodiment 4.

Of course, it is understood that, as in a hydraulic drive system 1F according to one variation shown in FIG. 11, the regenerative hydraulic motor 18 may be a variable displacement motor, and the rotation speed meter 85 measuring the rotation speed of the turning hydraulic motor 14 may be installed, similar to Embodiment 2.

Other Embodiments

The present invention is not limited to the above-described Embodiments 1 to 4. Various modifications can be made without departing from the spirit of the present invention.

For example, in each of Embodiments 1 to 4, a one-way clutch may be provided between the regenerative hydraulic motor 18 and the pump 16.

Moreover, the second electrical storage device 25 and the second power converter 24 may be eliminated.

REFERENCE SIGNS LIST

1A to 1C hydraulic drive system
8 controller
10 construction machine
11 boom cylinder
14 turning hydraulic motor
15 engine
16 pump
18 regenerative hydraulic motor
19 regenerative hydraulic motor regulator
21 alternator
22 first power converter
23 first electrical storage device
32, 37 boom discharge line
35, 36 tank line
41 boom control valve
51 turning control valve
55, 56 turning operation proportional valve
71 regenerative switching valve
75 boom regenerative operation proportional valve
77 turning regenerative operation proportional valve

The invention claimed is:

1. A hydraulic drive system of a construction machine, comprising:

a pump that supplies hydraulic oil to a boom cylinder and a turning hydraulic motor;

a regenerative hydraulic motor that is coupled to the pump and to which the hydraulic oil discharged from the boom cylinder at a time of boom lowering and/or the hydraulic oil discharged from the turning hydraulic motor at a time of turning deceleration is/are led;

an engine that drives the pump;

an alternator mounted to the engine and operable to rotate an output shaft of the engine when electric power is supplied to the alternator;

an electrical storage device connected to the alternator;

a power converter interposed between the alternator and the electrical storage device, the power converter being switched between a servo-on state in which electric power transmission between the alternator and the electrical storage device is enabled and a servo-off state in which electric power transmission between the alternator and the electrical storage device is disabled; and a controller that switches the power converter to either the servo-on state or the servo-off state and that controls, when switching the power converter to the servo-on state, the power converter either in a charging mode of adjusting electric power transmitted from the alternator to the electrical storage device or in a discharging mode of adjusting electric power transmitted from the electrical storage device to the alternator.

2. The hydraulic drive system of a construction machine according to claim 1, wherein the hydraulic oil discharged from the boom cylinder at the time of boom lowering is led to the regenerative hydraulic motor, and when a boom charging condition, which is a condition that boom lowering be currently performed and the electrical storage device be currently in a chargeable state, is satisfied, the controller switches the power converter to the servo-on state and controls the power converter in the charging mode, and when the boom charging condition is not satisfied, the controller either switches the power converter to the servo-off state, or switches the power converter to the servo-on state and controls the power converter in the discharging mode.

3. The hydraulic drive system of a construction machine according to claim 1, wherein the hydraulic oil discharged from the boom cylinder at the time of boom lowering and the hydraulic oil discharged from the turning hydraulic motor at the time of turning deceleration are led to the regenerative hydraulic motor, and when either a boom charging condition, which is a condition that boom lowering be currently performed and the electrical storage device be currently in a chargeable state, or a turning charging condition, which is a condition that turning deceleration be currently performed and the electrical storage device be currently in a chargeable state, is satisfied, the controller switches the power converter to the servo-on state and controls the power converter in the charging mode, and when neither the boom charging condition nor the turning charging condition is satisfied, the controller either switches the power converter to the servo-off state, or switches the power converter to the servo-on state and controls the power converter in the discharging mode.

4. The hydraulic drive system of a construction machine according to claim 2, comprising a boom control valve that controls supply and discharge of the hydraulic oil to and from the boom cylinder, wherein the boom control valve is connected to the regenerative hydraulic motor by a boom discharge line, and a tank line is connected to the boom control valve, and the boom control valve is configured such that at a time of boom raising, the hydraulic oil discharged from the boom cylinder flows into the tank line through the boom control valve, and at the time of boom lowering, the hydraulic oil discharged from the boom cylinder flows into the boom discharge line through the boom control valve.

5. The hydraulic drive system of a construction machine according to claim 1, wherein the regenerative hydraulic motor is a variable displacement motor whose tilting angle is changeable, the hydraulic drive system comprises a regenerative hydraulic motor regulator that adjusts the tilting angle of the regenerative hydraulic motor, and when the turning charging condition is satisfied, the controller controls the regenerative hydraulic motor regulator, such that the higher a rotation speed of the turning hydraulic motor, the greater the tilting angle of the regenerative hydraulic motor.

6. The hydraulic drive system of a construction machine according to claim 1, wherein the regenerative hydraulic motor is a variable displacement motor whose tilting angle is changeable, the hydraulic drive system comprises a regenerative hydraulic motor regulator that adjusts the tilting angle of the regenerative hydraulic motor, and when the boom charging condition is satisfied, the controller controls the regenerative hydraulic motor regulator, such that the more an operation amount of a boom operation valve, the greater the tilting angle of the regenerative hydraulic motor.

7. The hydraulic drive system of a construction machine according to claim 1, wherein the alternator is a power generator whose nominal voltage is not less than 30 V.

* * * * *